(No Model.) 2 Sheets—Sheet 1.

I. HENDERSON.
KNEADER AND MIXER.

No. 560,794. Patented May 26, 1896.

WITNESSES:
William Goebel
C. Sedgwick

INVENTOR
I. Henderson
BY
Munn & Co
ATTORNEYS.

(No Model.) 2 Sheets—Sheet 2.
I. HENDERSON.
KNEADER AND MIXER.
No. 560,794. Patented May 26, 1896.
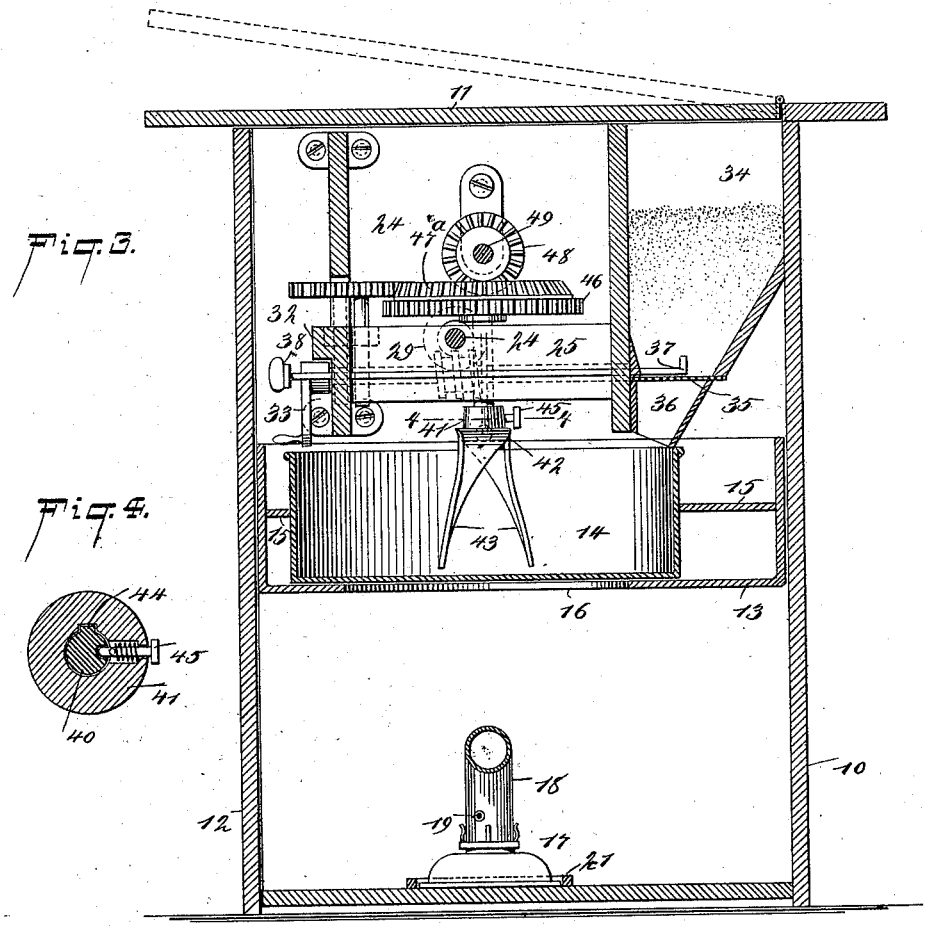
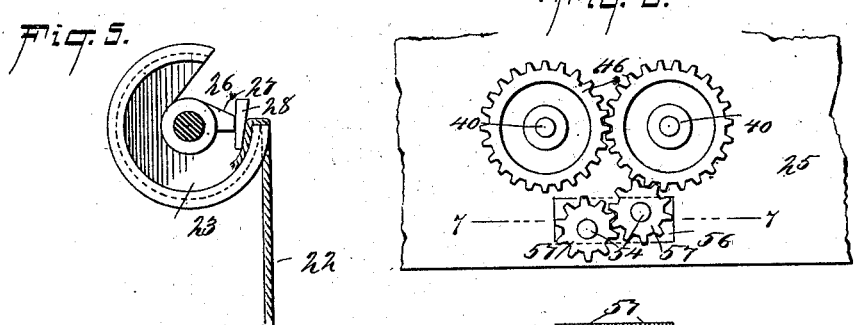
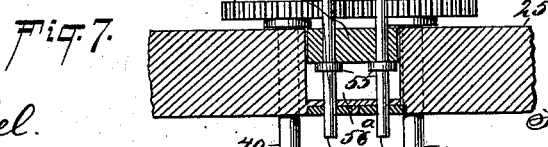
WITNESSES:
William Goebel.
C. Sedgwick.
INVENTOR
I. Henderson
BY
Munn & Co
ATTORNEYS.

UNITED STATES PATENT OFFICE.

ISAAC HENDERSON, OF VANCOUVER, CANADA.

KNEADER AND MIXER.

SPECIFICATION forming part of Letters Patent No. 560,794, dated May 26, 1896.

Application filed August 28, 1893. Renewed October 28, 1895. Serial No. 567,162. (No model.)

*To all whom it may concern:*

Be it known that I, ISAAC HENDERSON, of Vancouver, in the Province of British Columbia and Dominion of Canada, have invented certain new and useful Improvements in Kneaders and Mixers, of which the following is a full, clear, and exact description.

My invention relates to improvements in machines for kneading dough and similar things and in mixing various articles.

The object of my invention is to produce a very simple, durable, and easily-operated machine which is especially adapted for kneading and mixing dough for bread, cakes, &c., which when used for mixing dough may also be used for raising the same, and which while especially adapted for dough mixing and raising may also be used for mixing paint or any other semi-liquid and mixable material.

A further object of my invention is to provide a machine with revoluble mixing and kneading blades which are arranged in such a way as to give a wide range to the machine—that is, they may be set to operate effectively in several different sizes of pans—and which also are adapted to have a rubbing as well as a mixing effect upon the materials to be mingled.

Another object of my invention is to arrange the mixing-blades so that they will alternately pull and push the dough which is to be kneaded, operating upon it in a way somewhat similar to the manner in which it is kneaded by hand.

To these ends my invention relates to improvements in certain features of construction and combinations of parts, as will be hereinafter described and claimed.

Reference is to be had to the accompanying drawings, forming a part of this specification, in which similar figures of reference indicate corresponding parts in all the views.

Figure 1:
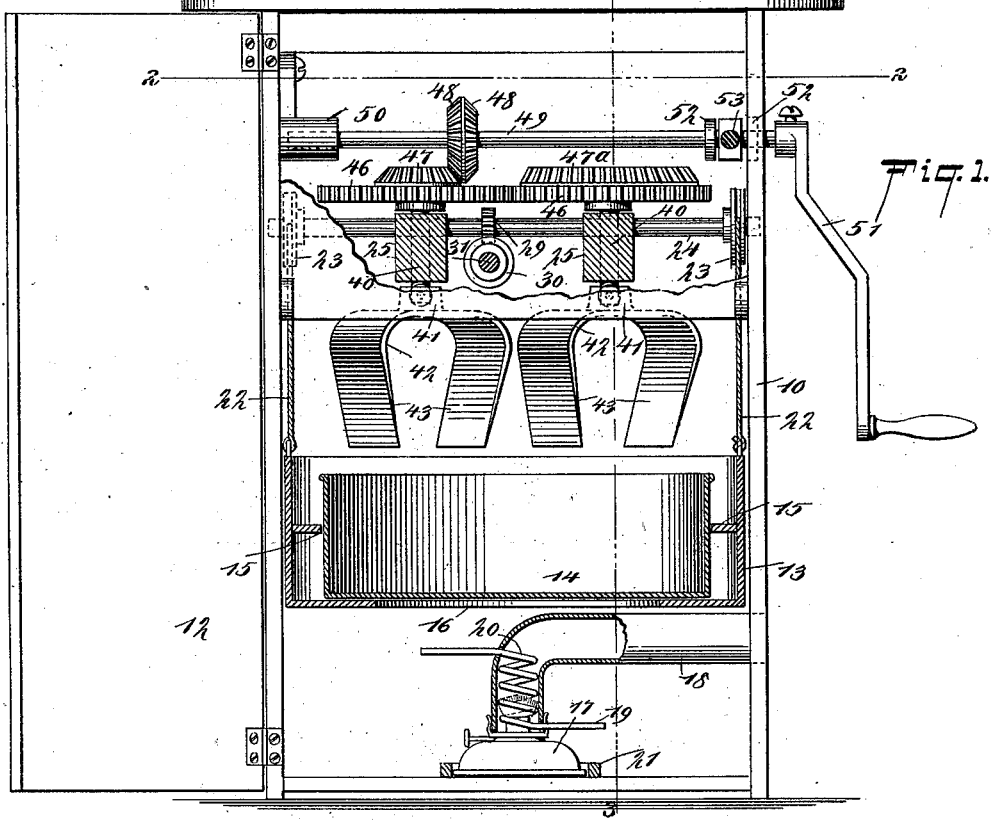
Figure 2:
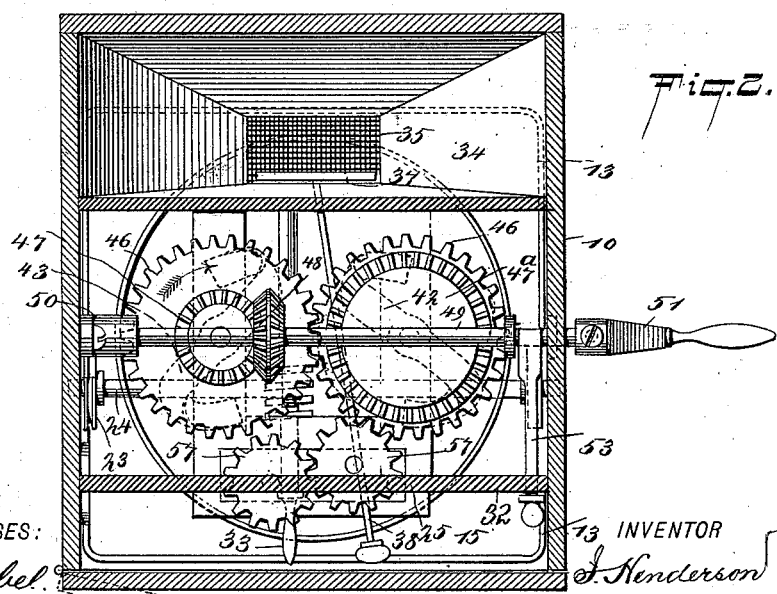

Figure 1 is a broken front elevation of the open machine, with parts in vertical section. Fig. 2 is a sectional plan on the line 2 2 in Fig. 1. Fig. 3 is a vertical cross-section on the line 3 3 in Fig. 1. Fig. 4 is a detail cross-section on the line 4 4 in Fig. 3. Fig. 5 is a detail sectional view of one of the hoisting-pulleys used in adjusting the pan-hanger. Fig. 6 is a sectional plan of the gear mechanism used for revolving the mixing-blades, and Fig. 7 is a detail vertical section on the line 7 7 in Fig. 6.

The machine is provided with a suitable case 10, which has a swinging lid or top 11, and this may be used as a kneading-board when desired. The case is also provided with a suitable door 12 in front, which enables the inner mechanism to be easily reached. Within the case is suspended a pan-carrying hanger 13, which is open at the top and is adapted to carry a mixing-pan 14, and the hanger is provided on its sides with curved ribs 15, which are adapted to fit against the pan and prevent the same from being knocked about by the movement of the stirring-blades.

The pan and hanger may be made of any desired shape, and different sizes of both may be employed, according to the amount of material to be mixed. The hanger is perforated on the bottom, as shown at 16, so that the heat from the lamp 17 below it may rise into direct contact with the pan 14, so as to effectively heat the material therein. The lamp 17 may be of any usual kind; but it is preferably provided with a curved chimney 18, which leads through the side of the case 10, and which thus carries off any noxious gases generated by the lamp. Within the chimney is a coil 20, formed in a pipe 19, the ends of which project through the chimney, and the air heated in the coil is thus injected into the case. A ledge 21 is arranged on the floor of the case to encircle the lamp and prevent the displacement of the latter. The pan-hanger 13 is suspended above the lamp by means of cords 22, which at their upper ends are secured to pulleys 23 on a transverse shaft 24, which is journaled in suitable supports 25 in the upper portion of the case, and by means of the pulleys and shafts the cords and hanger may be adjusted as to height. Each pulley 23 is grooved and is cut away on one side, as shown at 26, near which portion it is provided with a lug 27, and a wedge 28 is adapted to be inserted between this lug and the flange of the pulley, so as to bind the cord between the wedge and flange, as illustrated in Fig. 5. Any other suitable pulley may be used; but this form may be preferably employed, as it enables the cord to be readily attached and detached.

On the shaft 24 is a worm-wheel 29, meshing with a screw 30 on a shaft 31, which shaft extends at right angles to the shaft 24 and is supported at one end in a suitable support 32, near the front of the case, and at the other in the wall of the flour hopper or bin. The front end of the shaft 31 is provided with a crank 33, by which it may be turned and the shaft revolved so as to raise or lower the hanger 13.

In the back upper portion of the case is a hopper or bin 34, adapted to contain flour, and this hopper has an inclined bottom which is provided with a screen 35, and beneath this is a chute 36, adapted to deliver into the pan 14. A rake 37 is arranged to move over the screen, so as to cause the flour to sift through readily, and the rake is provided with a long handle 38, which extends forward through the wall of the hopper 34 and through the support 32, so that the rake may be operated from the front of the apparatus. Above the pan 14 are parallel vertical spindles 40, which are journaled in the supports 25, and which at their lower ends have secured to them the hubs 41 of the revoluble mixing-blades 42, these blades having depending and slightly-twisted ends 43, which are adapted to project downward into the pan 14, and the opposite ends of which are twisted in opposite directions. As a consequence, when these blades are submerged in the material in the pan and are revolved rapidly, the material is agitated by the depending ends of the blades which operate to push the material together toward the center of the pan, and then stretch or pull the material apart, this action being rapidly repeated as the blades are revolved, so that the material, if thin, is thoroughly mingled, and if of a sufficient consistency to knead it is properly kneaded.

The hubs 41 of the mixing-blades are keyed to the spindles 40, as shown at 44 in Fig. 4, so that the hubs cannot slip on the spindles, and they are held from moving vertically by spring-pressed pins 45, which are secured in the hubs and enter recesses in the spindles. The means just described for fastening the blades to their carrying-spindles are suitable for the purpose; but any other convenient means may be employed which will permit the easy attachment of the blades. The spindles 40 have at their upper ends gears 46, and above the gears 46 beveled gear-wheels 47 and 47$^a$ of different sizes, which are adapted to engage the two-faced beveled pinion 48 on the driving-shaft 49, this shaft being journaled at one end in a long box 50, which permits it to slide longitudinally, (see Figs. 1 and 2,) and at the other in the case 10, the shaft projecting through the case and having at its outer end a crank 51, by which it may be turned. On the shaft are collars 52, which are adapted to engage one end of a lever 53, which slides in the partition 32, and by grasping which and pushing parallel upon it the shaft may be slipped in its bearings, so as to bring the pinion 48 into engagement with either the gear-wheel 47 or 47$^a$. This arrangement provides for changing the speed of the mixing-blades, as it will be seen that the blades turn much faster when the pinion engages the gear-wheel 47 than when it engages the larger gear-wheel 47$^a$.

To provide for using different sizes of mixing-blades and consequently different sizes of mixing-pans, a double set of gearing is employed, which is arranged as shown best in Figs. 6 and 7. In this arrangement the spindles 54 are used, which are parallel with the spindles 40 and with each other, but which are nearer together than the spindles 40. These spindles have collars 55 thereon which abut with a block 56, adapted to move vertically in a recess 56$^a$ in the support 25, and the spindles 54 are connected by gear-wheels 57, one of which also engages one of the gears 46, so that all the gear-wheels revolve together. The gear-wheels 57, when not in use, may be raised by means of the block 56, so as to throw them out of gear with the wheels 46, and any suitable means may be employed for holding them in this position; but when the block is depressed the spindles 54 are carried down and the gear-wheels 57 brought into connection with the gears 46. When relatively large blades are used, they are attached to the spindles 40, and when smaller ones are used they are attached to the spindles 54.

The operation of mixing is as follows: If ingredients are simply to be mingled, they are placed in the pan 14, which is arranged in the hanger 13, and the hanger is raised by means of the gear mechanism described until the mixing-blades extend downward into the pan. The driving-shaft 49 is then revolved, the pinion 48 being first placed into engagement with one of the gear-wheels 47 or 47$^a$, according to whether or not the mixing-blades are to be rapidly or more slowly revolved, and the action of the blades on the material causes it to be quickly and thoroughly mingled. In mixing and raising bread, however, the materials of the bread, when first put together and while comparatively thin, are placed in the pan, the pan raised, as specified, and the pinion 48 thrown into engagement with the pinion 47, so as to give a relatively high speed to the blades, after which the crank-shaft is revolved, as before, and the batter mixed. The lamp is then lighted and the mixing-pan lowered, after which the door 12 is closed and the sponge is left for a suitable time to rise. When the sponge is sufficiently raised, the bread-pan is again lifted, so as to bring the mixing-blades in contact with the sponge, and the pinion 48 is changed, so as to engage the gear 47$^a$ and impart a relatively slow speed to the mixing-blades, which are then revolved, as before, and which work the sponge backward and forward, thoroughly kneading it. The pan is again lowered a few inches, left a few hours to rise once more, and it is again kneaded, then taken out, placed upon the lid or kneading-board 11, and formed into loaves, which are again placed in the pan and left to rise sufficiently for baking.

From the foregoing description it will be seen that any articles may be quickly and thoroughly mingled in the pan 14 by means of the mixing-blades and that bread may be kneaded in a very efficient manner. It will be understood that additional sets of gears may be provided, similar to those illustrated in Fig. 6, so that very many different sizes of blades and pans may be used with one machine.

Having thus described my invention, I claim as new and desire to secure by Letters Patent—

1. A machine of the kind described, comprising a case or cabinet, a vertically-movable hanger therein, a mixing-pan carried in the hanger, and a revoluble mixing-tool held to turn in the pan and having a plurality of depending blades, substantially as described.

2. A machine of the kind described, comprising a case, a pan-carrying hanger suspended therein, a worm-gear mechanism for adjusting the height of the hanger, a bread-pan carried by the hanger, and revoluble mixing-tools having depending blades adapted to turn in the pan, substantially as described.

3. The combination, with the main mixing-tool spindles, 40, and meshing gears, 46, keyed thereon, of the different-sized gear-wheels, 57, and their spindles, a block wherein the last-named spindles are secured and which is adjustable vertically in a guiding-recess in a fixed support and also removable from such recess, as and for the purpose specified.

4. The combination, with the pan and hanger, of the revoluble spindles geared together and arranged above the pan, and the mixing-tools detachably secured to the spindles and provided with depending blades to enter the pan, substantially as described.

5. The combination, with the hanger and pan, of mixing-tools arranged to turn in the pan and provided with vertical spindles geared together, different-sized gear-wheels secured to the tops of the mixing-tool spindles, a sliding crank-shaft arranged adjacent to the gear-wheels, and a pinion on the shaft to engage either of the said gear-wheels, substantially as described.

ISAAC HENDERSON.

Witnesses:
  J. B. TIFFIN,
  THOMSON BLACK.